(12) United States Patent
Bixby et al.

(10) Patent No.: US 9,233,722 B1
(45) Date of Patent: Jan. 12, 2016

(54) SKIRT ACCESS

(71) Applicant: International Truck Intellectual Property Company, LLC, Lisle, IL (US)

(72) Inventors: Timothy Joseph Bixby, Aurora, IL (US); Glen Joel Durmisevich, Rochester Hills, MI (US); James Michael Stanick, Lombard, IL (US); William J. Kobilsek, Mendota, IL (US); Daniel L. Imperati, LaGrange, IL (US); Daniel A. Pucher, Wheaton, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 14/528,653

(22) Filed: Oct. 30, 2014

(51) Int. Cl.
*B62D 25/22* (2006.01)
*B62D 33/08* (2006.01)
*B60R 3/00* (2006.01)

(52) U.S. Cl.
CPC .. *B62D 33/08* (2013.01); *B60R 3/00* (2013.01)

(58) Field of Classification Search
CPC ........ B62D 33/06; B62D 33/08; B62D 24/00; B62D 25/02; B62D 25/24; B60R 3/00; B60R 3/007; B60R 3/02
USPC ............... 280/163, 164.1, 166; 296/191, 198, 296/187.12
See application file for complete search history.

(56) References Cited

U.S. PATENT DOCUMENTS

| | | | |
|---|---|---|---|
| 4,991,906 A | 2/1991 | Fingerle | |
| 5,788,321 A | 8/1998 | McHorse | |
| 5,947,520 A | 9/1999 | McHorse | |
| 6,257,655 B1 | 7/2001 | Selby | |
| 6,257,656 B1 | 7/2001 | Cook | |
| 6,755,460 B1 * | 6/2004 | Marrs | B62D 33/00 280/833 |
| 6,896,318 B2 | 5/2005 | Marrs | |
| 6,905,164 B2 | 6/2005 | Marrs | |
| 7,163,258 B2 | 1/2007 | Dyer, II | |
| 7,578,546 B2 | 8/2009 | Grady | |
| 7,637,563 B2 | 12/2009 | Plett | |
| 7,896,426 B2 | 3/2011 | Plett | |
| 8,056,959 B2 | 11/2011 | Plett | |
| 8,814,252 B2 * | 8/2014 | Song | B60R 19/565 293/128 |
| 2005/0012344 A1 * | 1/2005 | Sorrells | B62D 35/001 292/169 |

* cited by examiner

*Primary Examiner* — John Walters
(74) *Attorney, Agent, or Firm* — Jeffrey P. Calfa; Mark C. Bach

(57) ABSTRACT

A skirt access comprises a base operatively connected with the truck. A frame operatively connects with the skirt. The frame is pivotally connected with the base. An arm releasably fixes the base with the frame. A step is disposed on the skirt. A linkage operatively connects the step with the arm so that movement of the step causes movement of the arm thereby allowing movement of the skirt.

4 Claims, 7 Drawing Sheets

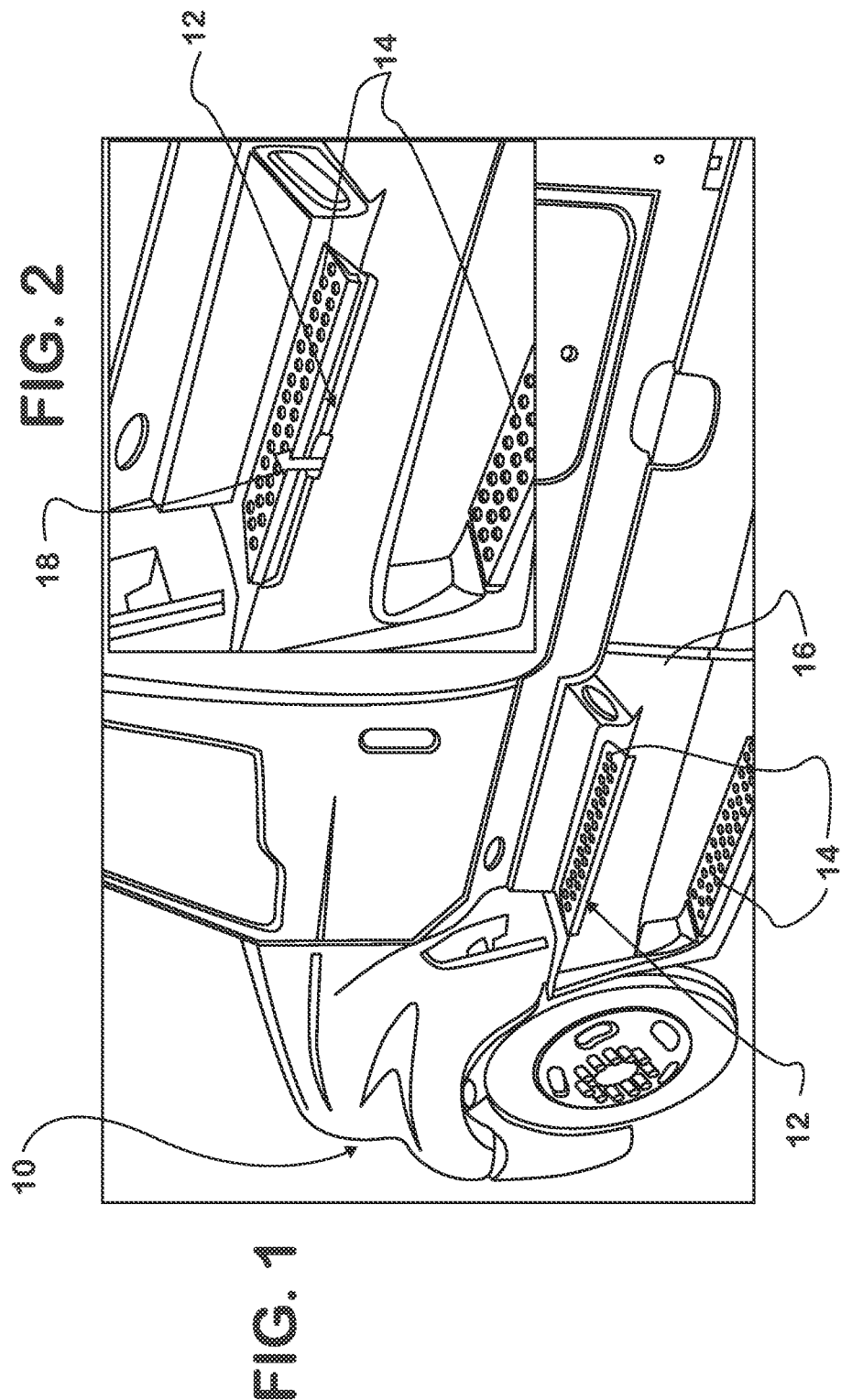

SKIRT ACCESS

BACKGROUND

This disclosure generally relates to apparatus and to methods for accessing a chassis mounted skirt on a vehicle, such as a truck and the like.

A vehicle may have a chassis mounted skirt for many reasons, such as to enhance aerodynamics of the vehicle and the like. The skirt may cover portions, such as a battery box, fuel tank, emissions systems components and the like, of the vehicle to present a substantially smooth aerodynamic profile. At times, it may be necessary to access and/or to move the skirt to service the covered portions of the vehicle. It is desirable to provide an apparatus and a method for accessing the skirt.

SUMMARY

Disclosed herein are embodiments of apparatus and methods for accessing a skirt on a truck. In one embodiment, the skirt access comprises a base operatively connected with the truck. A frame operatively connects with the skirt. The frame is pivotally connected with the base. An arm releasably fixes the base with the frame. A step is disposed on the skirt. A linkage operatively connects the step with the arm so that movement of the step causes movement of the arm thereby allowing movement of the skirt.

DESCRIPTION OF THE DRAWINGS

FIG. 1 is a perspective view of a side of a truck having an embodiment of skirt access described herein;

FIG. 2 is an enlarged view of a portion of FIG. 1;

DETAILED DESCRIPTION

Disclosed herein are embodiments of an apparatus and a method for accessing a skirt on a vehicle, such as a truck and the like. For sake of clarity of understanding, embodiments disclosed herein will be described with respect to their employment with a truck. However, it is to be understood that the embodiments described herein may be used in many different utilizations.

Referring to FIG. 1, a truck 10 includes an embodiment of skirt access 12 including a step 14 for accessing and/or moving a skirt 16. The step 14 is disposed on the skirt 16 and can be used by a user of the truck 10 to ascend and descend from a cab comprising the truck 10. As shown in FIG. 2, and as will be discussed in greater detail later, the skirt access 12 operates through manipulation of the step 14, indicated by arrow 18. No additional structures are required to operate the skirt access 12. Manipulation of the step 14 permits movement of the skirt 16 as desired by a user of the truck 10.

Figure 3:
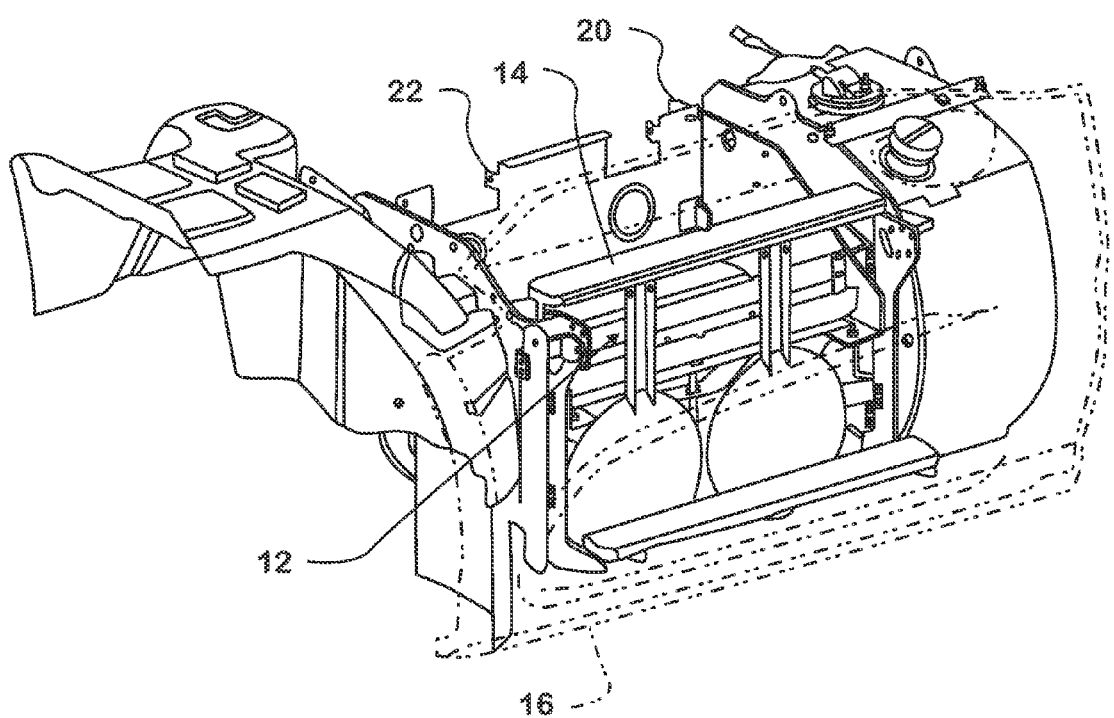
FIG. 3 is a fragmentary perspective view of an embodiment of skirt access described herein with a skirt in a first position.
Figure 7:
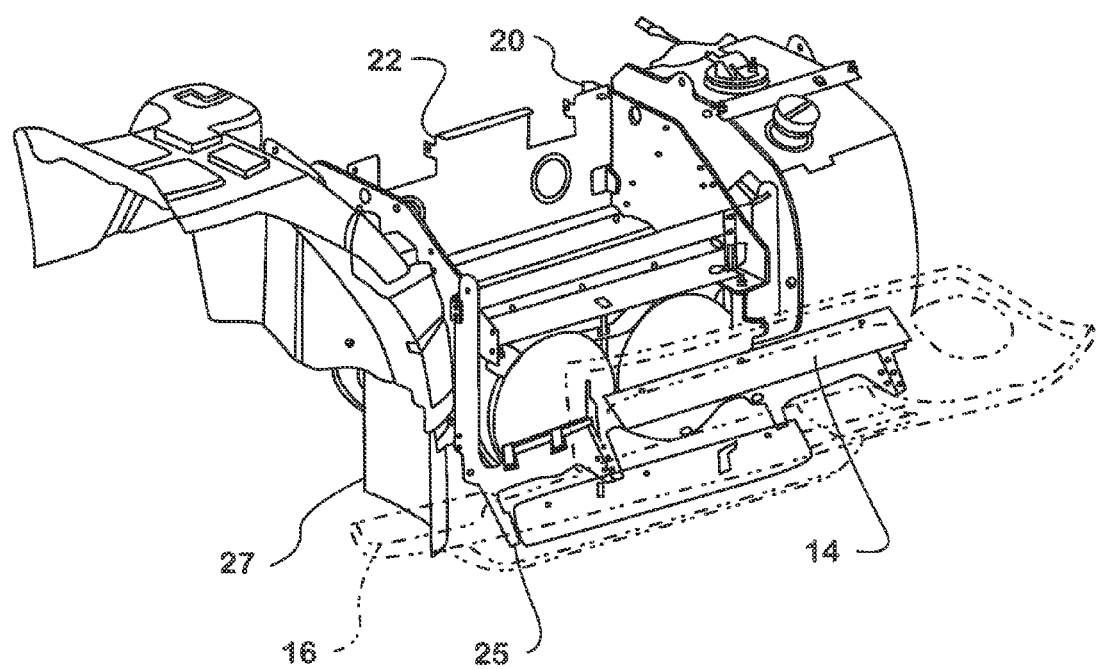
FIG. 7 is an fragmentary perspective view of the skirt access of FIG. 5 in a third position.
Figure 8:
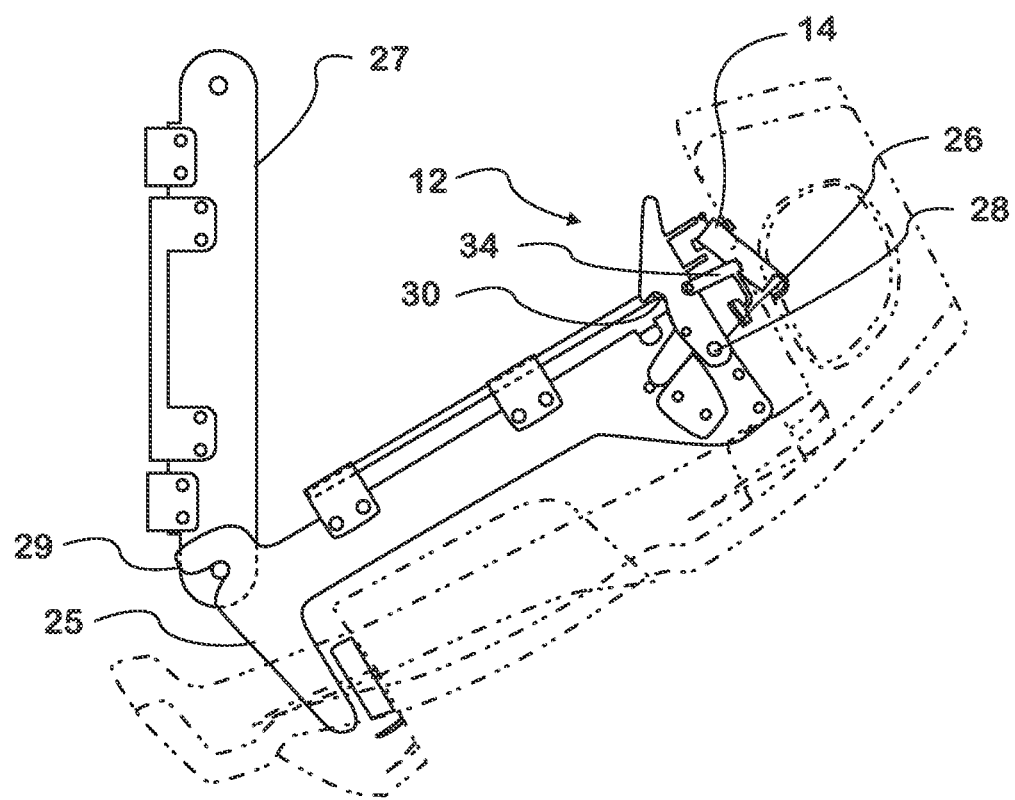
FIG. 8 is an enlarged view of the skirt access of FIG. 7.

Drawing attention to FIG. 3, a bracket 20 is mounted to a frame rail (not shown for clarity) of the truck 10. The bracket 20 extends outwardly away from the frame rail and forms a configuration defining a box 22. The box 22 can be used for any suitable function, such as retaining a battery, a fluid, e.g. fuel, diesel exhaust fluid or the like, tank or other needed element. The skirt access 12 operatively connects the bracket 20 with the skirt 16, portions shown in phantom in FIG. 3. Operation of the skirt access 12 allows the skirt 16 to move among a first position (FIGS. 3 and 4), a second position (FIGS. 5 and 6) and a third position (FIGS. 7 and 8). The first position represents the skirt 16 in condition generally applicable to operation of the truck 10. The third position presents the skirt 16 in condition generally applicable to accessing the box 22. The second position represents the skirt 16 in condition between the first position and the second position.

The skirt access 12 may comprise one assembly operatively connecting the skirt 16 with the bracket 20 or more than one assembly operatively connecting the skirt 16 with the bracket 20 located adjacent one end of the step 14. In another application of the skirt access 12, there is one assembly operatively connecting the skirt 16 with the bracket 20 adjacent one end of the step 14 and another assembly operatively connecting the skirt 16 with the bracket 20 adjacent an opposite end of the step 14. Any suitable arrangement of assemblies comprising the skirt access 12 is possible.

Figure 4:
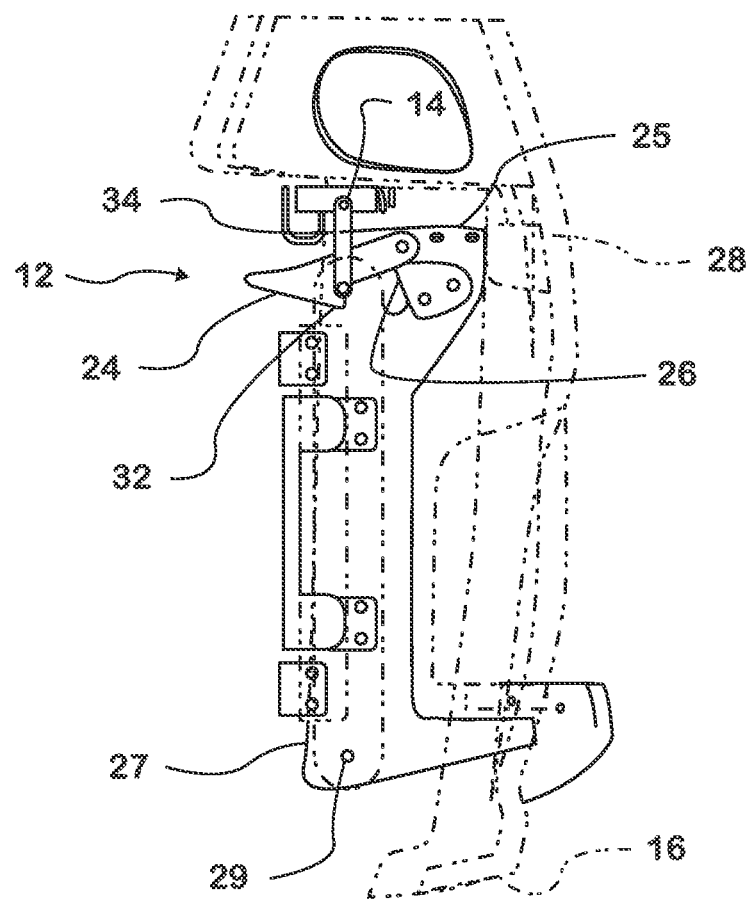
FIG. 4 is an enlarged view of the skirt access of FIG. 3.

An exemplary construction of the skirt access 12 is illustrated more clearly in FIG. 4. The skirt access 12 comprises an arm 24 pivotally connected at one end with a frame 25 at a pivot point 26. The frame 25 is attached to the skirt 14. A return member 28, such as a torsion spring and the like, may be included at connection between arm 24 and the frame 25 to bias the arm 24 towards the first position shown in FIG. 4. At an end thereof opposite to the pivot point 26, the frame 25 is pivotally connected with a base 27 at a joint 29. The base 27 is connected to the box 22. Hence, the base 27 is operatively connected with the truck 10. The arm 24 includes a recess 30 having a configuration that mates with a projection 32 extending from the base 27. When the projection 32 is in the recess 30, the base 27 and the frame 25 are releasably fixed. A linkage 34 operatively connects the arm 24 with the step 14 so that movement of the step 14 causes movement of the arm 24.

Figure 5:
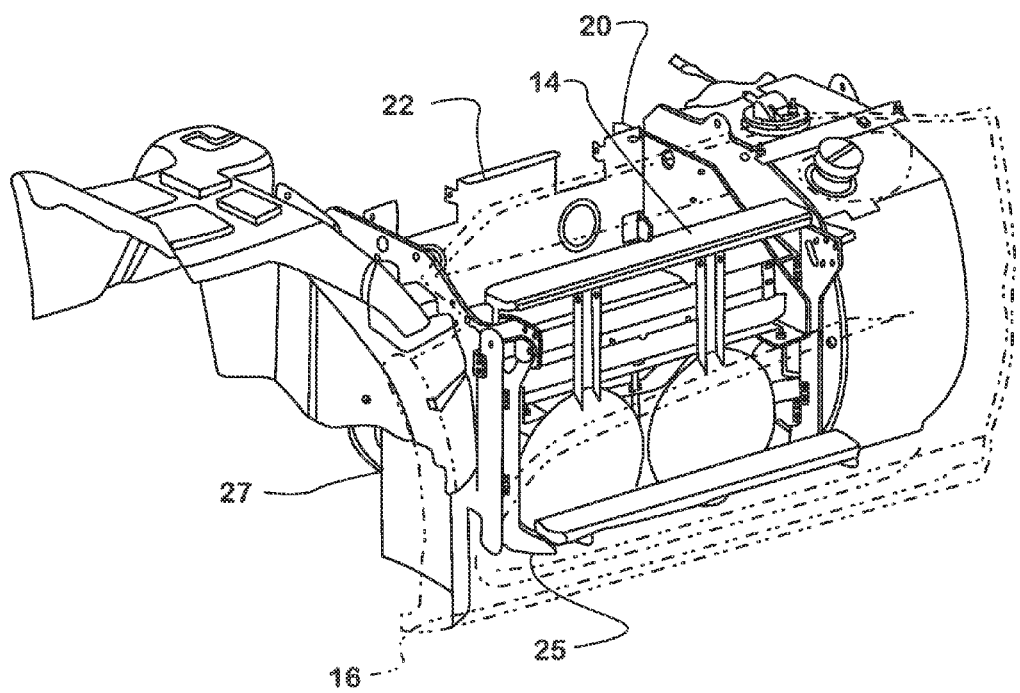
FIG. 5 is a fragmentary perspective view of the skirt access of FIG. 3 is a second position.
Figure 6:
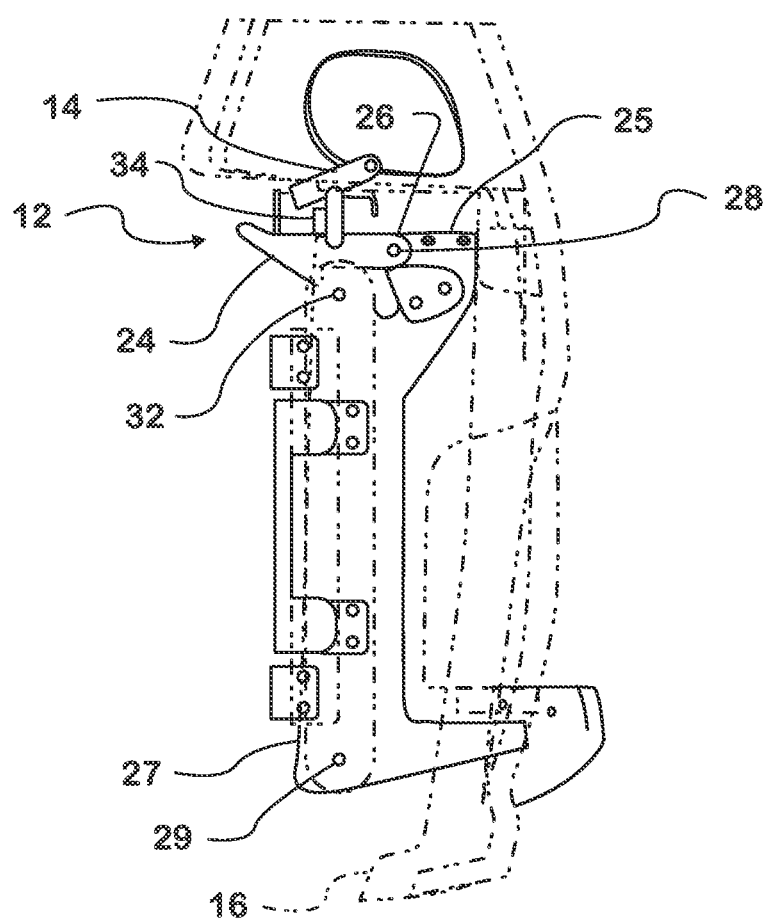
FIG. 6 is an enlarged view of the skirt access of FIG. 5.

Referring to FIGS. 5 and 6, movement of the step 14 causes movement of the linkage 34. Movement of the linkage 34 causes movement of the arm 24. Movement of the arm 24 moves the recess 30 away from the projection 32 extending from the base 27 thereby allowing relative movement of the frame 25 and the base 27. Because the frame 25 is connected with the skirt 16, movement of the step 14 allows for movement of the skirt 16.

Referring to FIGS. 7 and 8, movement of the step 14 allows movement of the skirt 16. Specifically, movement of the step 14 moves the recess 30 away from the projection 32 thereby allowing the frame 25 to move with respect to the base 27. With the skirt 16 in this position, a user of the truck 10 can access the box 22 and any contents therein. When the user of the truck 10 prefers, the user can move the skirt 16 toward the position shown in FIGS. 5 and 6. When the projection 32 is disposed within the recess 30, the user can move the step 14 to the position shown in FIGS. 3 and 4.

There are many options that can be added to the skirt access 12 and associated structures. In some embodiments, the linkage 34 comprises an elongated slot that accepts a pin on the arm 24. Movement of the pin within the elongated slot reduces likelihood that a user might be injured, such as having a finger caught under the step 14, while the skirt access 12 changes position. In other embodiments, a sensor, such as a contact sensor and the like, may be located adjacent moving parts of the skirt access 12. The sensor may be connected to a suitable feedback mechanism, such as a light, a speaker and the like, to provide the user with feedback indicative of position on the skirt access 12. Some embodiments may include mating features, such as a male feature on the frame 25 and a female feature on the base 27, to provide alignment of the skirt 16 on the truck 10. Additional embodiments include a lock operatively connected between the frame 25 and the base 27 to limit movement of the skirt access 12.

REFERENCE CHARACTERS

- 10 Truck
- 12 Skirt access
- 14 Step
- 16 Skirt
- 18 Arrow
- 20 Bracket
- 22 Box
- 24 Arm
- 25 Frame
- 26 Pivot point
- 27 Base
- 28 Return member
- 29 Joint
- 30 Recess (on 24)
- 32 Projection (on 27)
- 34 Linkage

What is claimed is:

1. A skirt access for accessing a skirt on a truck, the skirt access comprising:
    a base operatively connected with the truck;
    a frame operatively connected with the skirt, the frame being pivotally connected with the base;
    an arm releasably fixing the base with the frame;
    a step disposed on the skirt; and
    a linkage operatively connecting the step with the arm so that movement of the step causes movement of the arm thereby allowing movement of the skirt.

2. The skirt access as defined in claim 1 further comprising:
    a joint pivotally joining the base and the frame.

3. The skirt access as defined in claim 1 further comprising:
    a return member disposed between the frame and the arm.

4. The skirt access as defined in claim 1 further comprising:
    a recess disposed on the arm;
    a projection disposed on the base, the recess having a configuration that mates with the projection.

\* \* \* \* \*